Dec. 24, 1968     F. J. VLASATY     3,417,475
DEVICE FOR CHECKING INSTRUMENT ACCURACY AND WEAR
Filed Aug. 30, 1967     2 Sheets-Sheet 1
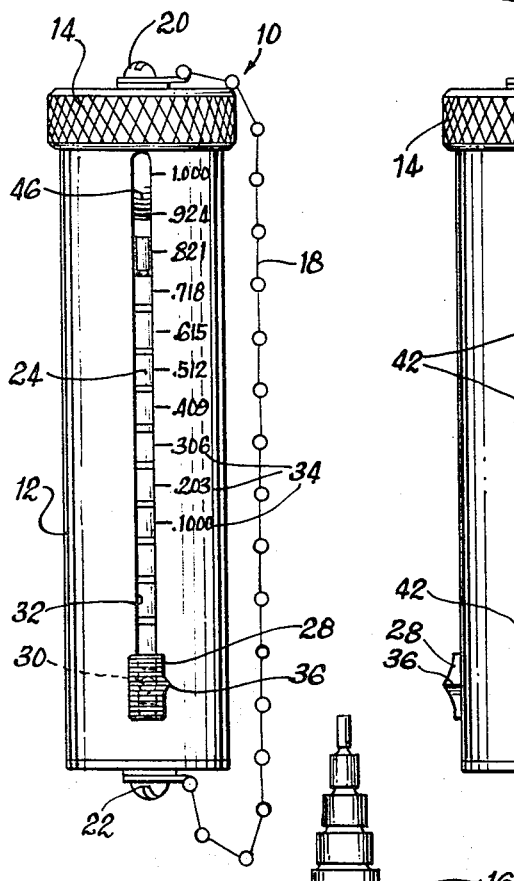
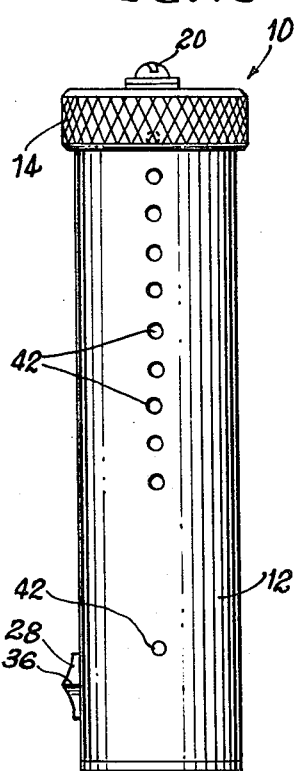
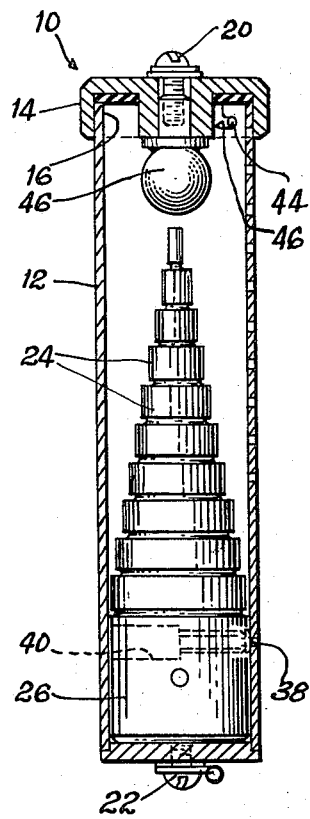
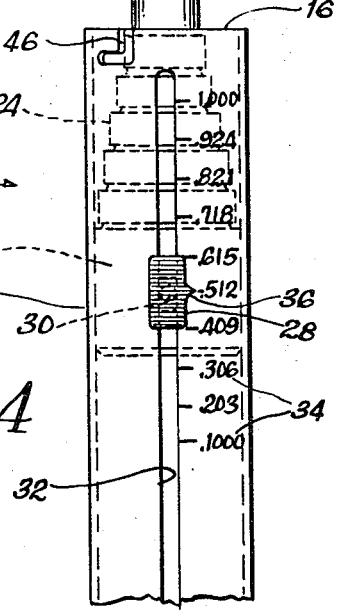
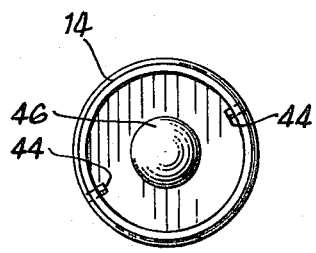
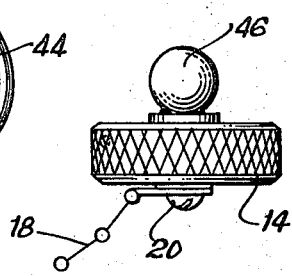
INVENTOR
Frank J. Vlasaty
by McDougall, Hersh & Scott
Attys Dec. 24, 1968     F. J. VLASATY     3,417,475

DEVICE FOR CHECKING INSTRUMENT ACCURACY AND WEAR

Filed Aug. 30, 1967     2 Sheets-Sheet 2

United States Patent Office 3,417,475
Patented Dec. 24, 1968

3,417,475
DEVICE FOR CHECKING INSTRUMENT
ACCURACY AND WEAR
Frank J. Vlasaty, Chicago, Ill., assignor to American Gage & Machine Company, Chicago, Ill., a corporation of Illinois
Continuation-in-part of application Ser. No. 511,064, Dec. 2, 1965. This application Aug. 30, 1967, Ser. No. 666,545
5 Claims. (Cl. 33—168)

ABSTRACT OF THE DISCLOSURE

A measuring device for checking instrument accuracy and wear comprising a plurality of measuring members fixed in relation to each other. Each measuring member is of different diameter so that a variety of test measurements can be taken. The device is particularly useful for checking spindle and anvil accuracy of micrometers, and the diameters of the measuring members are related so as to insure a proper test. Specifically, the diameters vary to the extent that rotation of a micrometer spindle for an amount other than a whole number of turns is required between measurements.

---

This application is a continuation-in-part of application Ser. No. 511,064, filed Dec. 2, 1965, now abandoned.

This invention relates to a measuring device adapted to be employed for checking the accuracy and wear of instruments. The invention is particularly adaptable for use in checking micrometers and similar instruments for spindle and anvil accuracy and setting.

Micrometers are extensively used as measuring instruments for applications requiring precise measurement. The micrometers are usually intended to measure in terms of thousandths of an inch, and to insure accuracy, it is necessary that the micrometers and similar instruments be precisely manufactured and then properly maintained to insure continued accuracy.

Gauge blocks can be utilized for checking the accuracy of micrometers. Such blocks comprise members which have precise known dimensions. The variations of the micrometer readings from the known dimension of a gauge block can be employed for determining the accuracy of the micrometer.

The use of gauge blocks involves certain undesirable factors. The initial cost of the gauge blocks is high. Furthermore, the gauge blocks are not completely satisfactory when employed for checking the accuracy of micrometers which are used for round pieces. Thus, such micrometers may be subject to wear of the anvil faces between the edges; however, the wear will not be detected with a flat gauge since defects will be bridged.

Gauge blocks also tend to become scuffed and scarred after a period of use. This is objectionable since the blocks are costly to replace and the blocks do not perform satisfactorily in such a condition since they lose their ability to "wring," that is, they will not adhere to one another when a build-up of several blocks is necessary.

It is an object of this invention to provide improved devices particularly adaptable for the checking of accuracy and wear of micrometers and similar instruments.

It is a more particular object of this invention to provide instruments for measuring spindle thread and anvil wear of micrometers, which instruments are adapted to detect inaccuracies in the micrometer even where the wear has taken place in specific areas of the micrometer.

It is a still further object of this invention to provide instruments of the type described which are constructed whereby a plurality of checking measurements can be made with the same instrument in an extremely efficient fashion.

These and other objects of this invention will appear hereinafter and for purposes of illustration but not of limitation, specific embodiments of this invention are shown in the accompanying drawings in which:

FIGURE 1 is a front elevational view of the device of this invention;

FIGURE 2 is a side elevational view of the device shown in FIGURE 1;

FIGURE 3 is a vertical sectional view of the device;

FIGURE 4 is a fragmentary view of the device illustrating measuring members thereof in their operative positions;

FIGURE 5 is a bottom plan view of a cap member adapted to be employed for the instrument;

FIGURE 6 is a side elevational view of the cap member shown in FIGURE 5;

Figure 7:
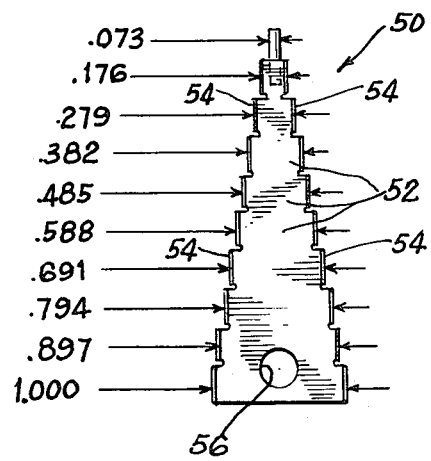
FIGURE 7 is an elevational view of an alternative form of the invention.

The measuring devices of this invention include a plurality of measuring members fixed in relation to each other. Each measuring member is of a different diameter so that a variety of measurements can be taken. A critical feature of the invention resides in the relationship of the various diameters. Specifically, the diameters vary to the extent that rotation of a micrometer spindle for an amount other than a whole number of turns is required between measurements.

One measuring device of this invention generally comprises a body portion defining an open interior. A plurality of measuring members are associated with the body portion and are adapted to be located within the interior of the body portion. Each of the measuring members defines opposed measuring surfaces whereby the accuracy of a micrometer or the like can be checked using the measuring surfaces. Thus, the respective measuring members are formed of hardened steel or similar wear-resistant material, and these members are of a known size.

The body portion for the device preferably comprises a cylindrical casing, and the measuring members are conveniently cylinders. The measuring cylinders are stacked in coaxial relationship with respect to each other, and means are provided for moving the members with respect to the casing whereby the members can be successively exposed at an open end of a casing for undertaking a measuring operation.

Indicating means are associated with the construction, and the known values of the respective cylinders are displayed on a side wall of the casing. The indicating means are adapted to point to one of these values, depending upon the particular cylinder which is exposed in measuring position. Thus, the user of the device can readily determine the exact size of the measuring cylinder being employed whereby an immediate comparison with the micrometer reading can be accomplished.

In another form of the invention, the measuring members do not comprise segments of cylinders rather than full cylindres. The casing may or may not be used with this arrangement.

The accompanying drawings illustrate an instrument 10 comprising a preferred form of the instant invention. The instrument includes a body portion 12 in the form of a cylindrical casing. A cap member 14 closes off the open end 16 of the casing. A chain 18 is preferably attached by means of screw 20 to the cap member and the opposite end of the chain is attached to the bottom of the casing by means of screw 22. The chain thus secures the cap member to the casing.

The interior of the casing 12 is hollow, and an assembly of measuring members is adapted to be located within this hollow interior. The measuring members comprise cylinders 24, and in the embodiment shown, the top cylinder has a relatively small outer diameter while the lower cylinders have successively increasing outer diameters. The stack of cylinders is mounted on a base member 26. This entire assembly could be machined from a single block of material or the individual pieces could be connected together to form the completed assembly.

A combination button and pointer member 28 is associated with the instrument. The member 28 is mounted on a stem 30 which extends through a slot 32 in the side wall of the casing. The stem 30 is attached to the base member 26 whereby movement of the button operates to achieve corresponding movement in the assembly of cylinders 24.

Each of the cylinders 24 is of a known diameter, and values 34 corresponding to these diameters are displayed on the side wall of the casing adjacent the slot 32. As will be explained, the cylinders are adapted to be positioned outside the casing by movement through the open end 16 thereof. As each cylinder is positioned outside the casing, the pointer 36 associated with the member 28 is adapted to be located immediately opposite one of the values 34. To insure precise positioning of the pointer 36, a pin 38 is associated with the base member 26. Spring means are included in the cavity 40 of the base member immediately behind the pin 38. Index openings 42 are defined by the side wall of the casing, and the pin 38 is adapted to be received in these respective openings. In the position shown in FIGURE 3, the pin is received in the lower opening 42, this arrangement serving to secure the assembly of cylinders in position when not in use for measuring purposes. The other openings 42 successively receive the pin 38 when the assembly of cylinders is indexed through the respective measuring positions.

The cap member 14 carries a pair of pins 44 which extend inwardly from the interior surface of the flange of the cap. L-shaped slots 46 are defined by the casing 12 whereby the cap 14 is adapted to be secured to the casing by a bayonet type arrangement.

The cap member also carries a ball 46 which is designed for measuring flatness and wear of the anvil faces of a micrometer. This ball is also of a known diameter and is formed of a suitable wear-resistant material. To inspect micrometer anvil faces for wear, the anvils of the micrometer are brought into contact with the ball 46 at the extreme edge of the anvil faces. The reading on the micrometer barrel is noted and, thereafter, the micrometer is moved whereby readings at a plurality of opposed anvil face portions can be noted. Variations in the readings will provide an indication of the amount of inaccuracies of the anvil faces.

For purposes of measuring spindle accuracy, the respective cylinders 24 are moved out through the open end 16 of the casing by means of the button member 28. When the upper cylinder is exposed through the open end of the casing, the pointer 36 will indicate the lowermost value, in this case .100 inch. When this reading has been taken, the button member 28 is moved to the next position whereby the second cylinder will be exposed for measuring purposes. This operation can be continued until a reading is accomplished for each of the cylinders 24.

As noted, micrometers may be inaccurate only in selected areas on their scale of readings. Accordingly, the device of this invention is intended to provide a sufficient number of different readings for detecting any inaccurate areas. In the disclosed construction, 10 readings are provided for a micrometer having a range from zero to one inch. Obviously, the number of measuring cylinders can be varied depending upon the particular micrometer to be tested.

In some instances, lead error and thread wear in a micrometer will be revealed at more than one point on the scale of the micrometer. Thus, an inaccuray may be determined at one point and the same inaccuracy will be revealed when the micrometer is turned through exactly one revolution. It is also possible to miss detecting of an inaccuracy if a first reading is taken and the next reading taken by turning the micrometer through one exact revolution. For example, micrometers are manufactured whereby .025 inch is travel for each revolution of the spindle. If all of the readings are taken at .1 inch intervals (four revolutions), the relative positions of the spindle threads will be the same for each reading, and it is quite possible that thread and anvil inaccuracies which would be revealed at some intermediate thread relationship will not be detected.

In accordance with the instant invention, respective measurements are taken at intervals which do not involve whole number turns. In the disclosed arrangement, slightly more than four revolutions of movement, for example four revolutions plus 45°, takes place between each measurement. Obviously, in the case of movements which involve an exact full revolution or which comprise any number of whole revolutions, the same relative positions between the threads and anvil will occur at each measurement. Movements which do not involve an exact revolution are thus preferred since this eliminates stopping at the same point whereby out of parallelism between the anvil faces can be detected. In the event that a micrometer is known to be consistently used to inspect a part at one or several different specific sizes, special instruments characterized by the features of this invention can be designed to check these specific points of the micrometer spindle thread.

Figure 8:
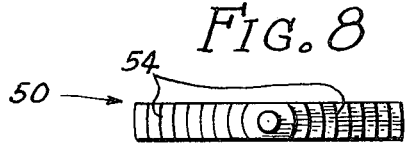
FIGURE 8 is a top plan view of the structure shown in FIGURE 7.

The device 50 shown in FIGURES 7 and 8 also includes a plurality of measuring members designated 52. Each of the measuring members includes opposed measuring surfaces 54, and these opposed surfaces define segments of a cylinder. It will be noted, however, that the device 50 presents a relatively flat configuration so that its bulk is substantially reduced. By providing measuring surfaces which define segments of a cylinder, the advantages described above can be achieved while the structure itself can be more easily handled in some instances. Thus, the cylindrical surfaces provide accurate measurement in the event that the micrometers being tested are subject to wear of the anvil faces between edges. The device 50 will detect such wear while still providing a relatively compact structure.

It will be noted that the device 50 provides 10 measuring surfaces as is the case with the device 10. In this instance, however, the diameters vary in a different fashion; however, provision is still made for the critical feature of the invention wherein the diameters of the successive cylinders vary to the extent that rotation of the micrometer spindle for an amount other than a whole number revolution is required between measurements.

The device 50 can be mounted in a housing in essentially the same manner as the device 10. Thus, a bore 56 is provided in the base of the device for mounting purposes, and this bore could be used for connection with an actuating member such as the button 28. It will be apparent, however, that a rectangular housing dimensioned to receive the device 50 would be satisfactory while in some instances, the device could be used without the provision of a housing.

The instruments described are capable of providing for checking of micrometers in an extremely efficient manner. The successive measurements for spindle and anvil wear can be quickly accomplished, and in this connection, an operator can hold the micrometer in one hand while moving the cylinders of the instrument with the other hand. Measurement of inaccuracies of the anvil faces by means of the ball 46 can also be achieved quite easily, and the combination of this invention which permits use of the same device for detecting anvil and spindle thread wear obviously comprises a highly desirable arrangement.

The instrument of this invention is particularly valuable with regard to detecting "lead error" of the spindle. The existence of "out of parallelism" in the anvies is also an extremely important characteristic when comparing the device of the invention to gauge blocks. Since a large number of measurements can be made using a single instrument, these measurements including the measurements with the ball 46 and the cylinders 24, the checking operation is considered extremely accurate. The portability and compact nature of the structure is also extremely important.

It will be understood that various changes and modifications may be made in the above described construction which provide the characteristics of this invention without departing from the spirit thereof.

That which is claimed is:

1. A device for measuring the spindle and anvil accuracy of a micrometer, the spindle comprising a rotatably mounted threaded member with each whole number revolution of the spindle moving the spindle a constant distance relative to the anvil, said device comprising a casing defining an open interior, a plurality of measuring means associated with said casing and adapted to be located within said interior, said measuring means comprising interconnected members axially aligned with respect to each other with each member defining a set of opposed measuring surfaces, the spacing between each set of measuring surfaces comprising a different measuring value, said members being adapted to be successively exposed at an open end of said casing for measuring purposes, a base member for supporting said cylinders, said base member having exterior dimensions corresponding with the interior dimensions of said casing, indicating means comprising a pointer attached to said base member, values displayed on the exterior surface of said casing at spaced apart locations, said pointer being mounted for movement over said exterior surface whereby said pointer can be selectively positioned opposite the respective values, a slot extending along the length of said casing, means connected to said base member and extending through said slot for attaching said pointer to said base member, said pointer also serving as a button member whereby said members can be moved into and out of said casing, said pointer automatically moving into position for indicating one of said values as the member corresponding to said value is moved to measuring position, and wherein the outer diameters of the successive members vary to the extent that rotation of the micrometer spindle for an amount other than a whole number of revolutions is required between measurements.

2. A device according to claim 1 wherein said measuring members comprise cylinders.

3. A device according to claim 1 wherein said measuring members comprise substantially flat members with their side edges comprising said measuring surfaces, said side edges comprising segments of a cylinder.

4. A device in accordance with claim 1 including a spring loaded means associated with said base member, openings formed in said casing, said spring loaded means being adatped to snap into locking engagement with said openings as each of said measuring members is exposed whereby said pointer is adapted to be precisely aligned with the respective values when the corresponding cylinders are moved to measuring positions.

5. A device in accordance with claim 1 including a cap member for closing said open end of said casing, a tooling ball attached to said cap member, said ball being adapted to be employed for checking the anvil faces of a micrometer for wear and inaccuracies of said faces.

References Cited

UNITED STATES PATENTS

| 69,954 | 10/1867 | Richards | 33—178 |
| 1,118,587 | 11/1914 | Schaum | 33—178 |
| 1,235,785 | 8/1917 | Fishel | 33—169 |
| 2,365,461 | 12/1944 | Fairbanks | 33—178 X |
| 2,611,186 | 9/1952 | Noble | 33—170 |
| 2,654,152 | 10/1953 | La Vire | 33—46.4 |

FOREIGN PATENTS 293,460   12/1953   Switzerland.

SAMUEL S. MATTHEWS, *Primary Examiner.*